Dec. 20, 1955  C. S. HAZARD ET AL  2,727,392
DENSITY MEASURING APPARATUS
Filed March 5, 1952  2 Sheets-Sheet 1
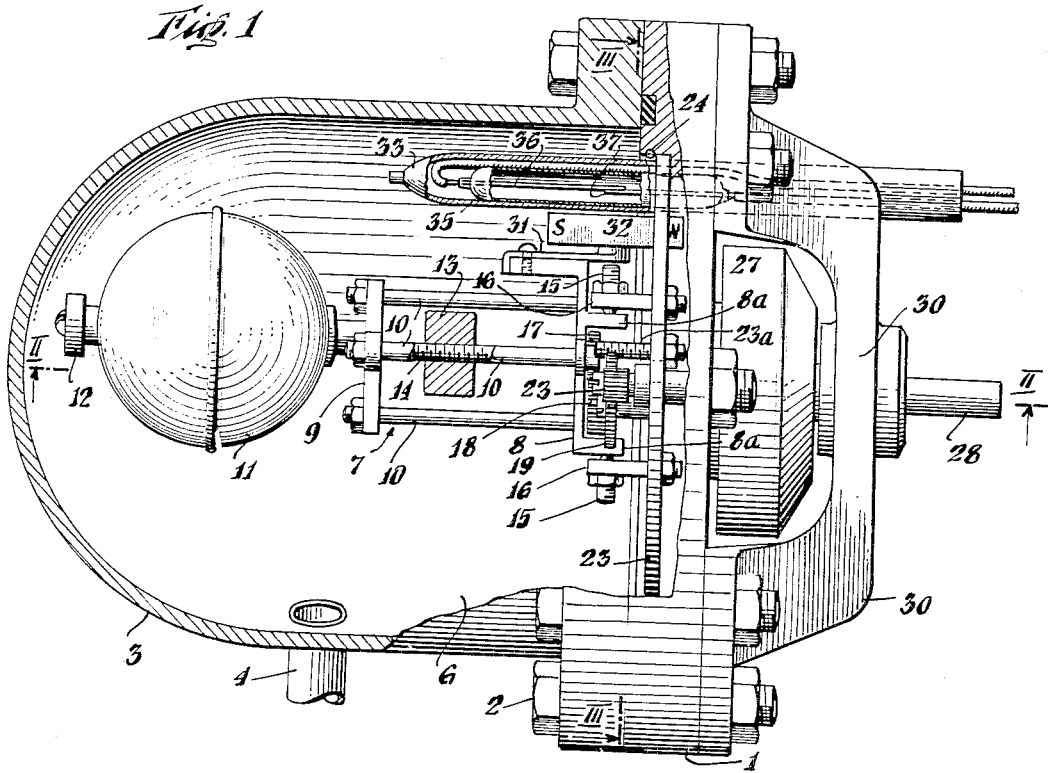
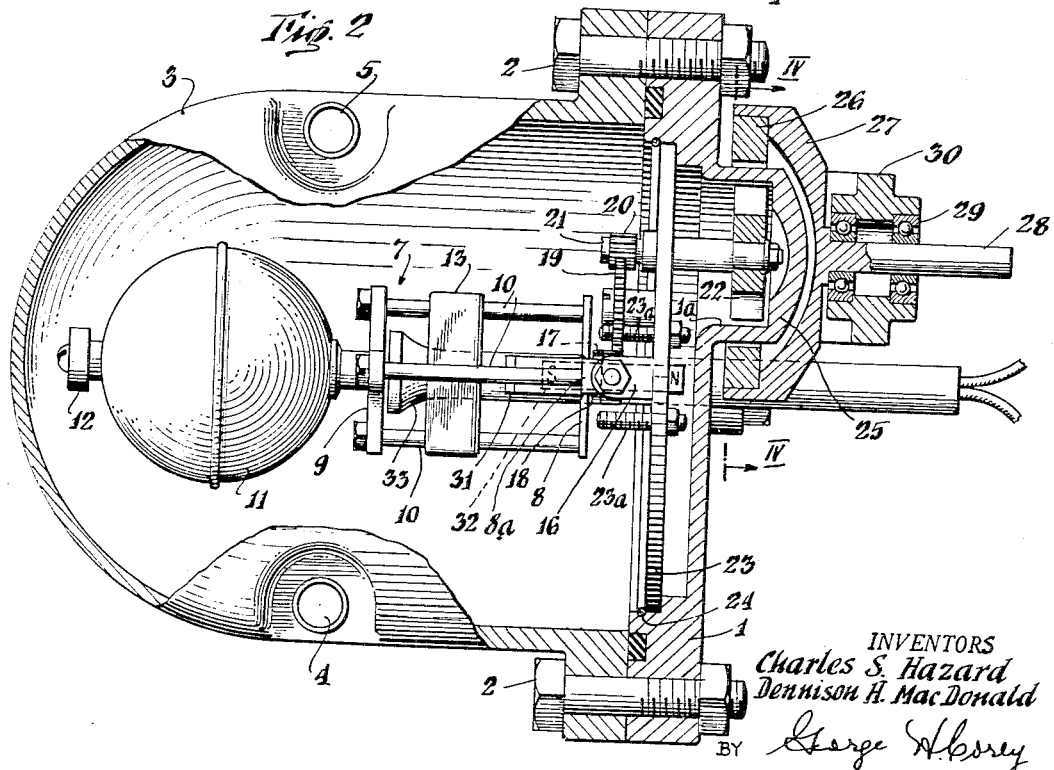
INVENTORS
Charles S. Hazard
Dennison H. MacDonald
BY George H. Corey
ATTORNEY Dec. 20, 1955  C. S. HAZARD ET AL  2,727,392
DENSITY MEASURING APPARATUS
Filed March 5, 1952
2 Sheets—Sheet 2
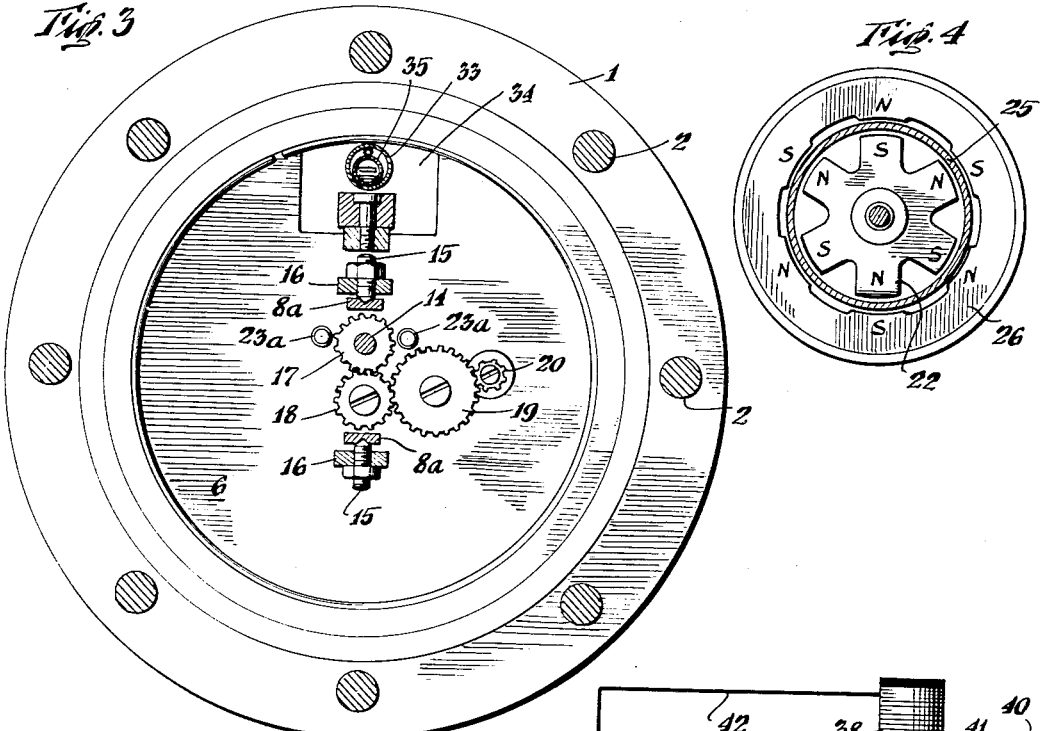
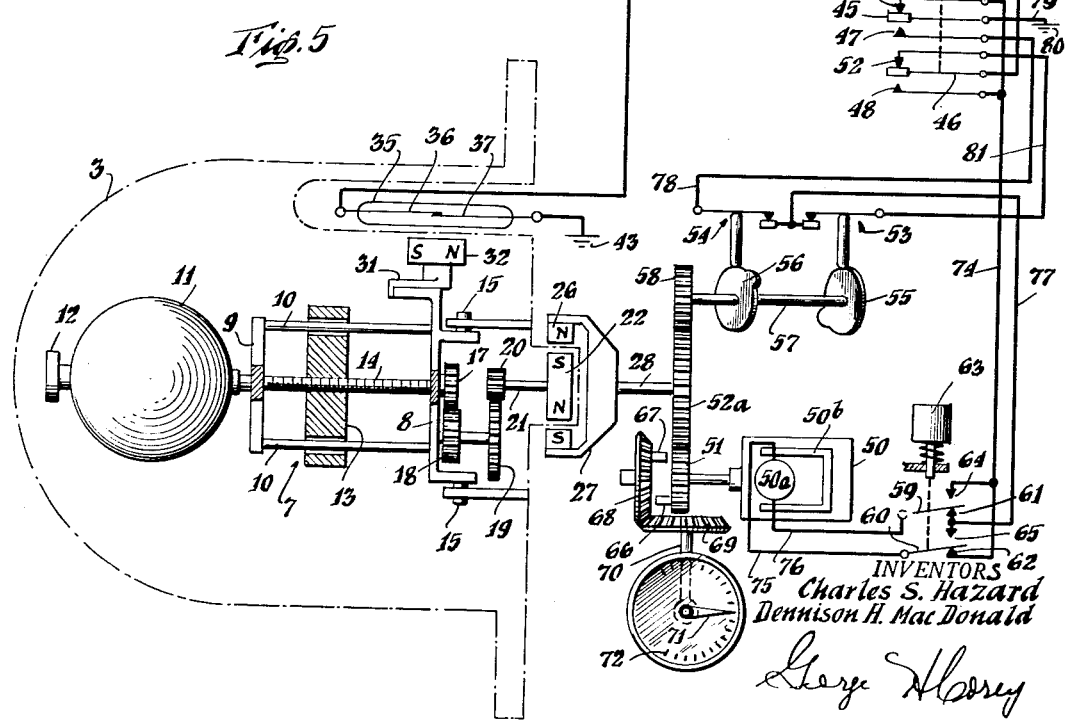
INVENTORS
Charles S. Hazard
Dennison H. MacDonald
George H. Corey
ATTORNEY

# United States Patent Office 2,727,392
Patented Dec. 20, 1955

2,727,392

DENSITY MEASURING APPARATUS

Charles S. Hazard, New York, N. Y., and Dennison H. MacDonald, East Haven, Conn., assignors to Revere Corporation of America, a corporation of New Jersey Application March 5, 1952, Serial No. 274,985

17 Claims. (Cl. 73—452)

The present invention relates to sensitive apparatus for measuring a variable condition such as the density of a fluid, and particularly to apparatus which is sensitive to small changes in the measured condition and which is effective to operate a load device in accordance with such small changes.

The invention is described herein as applied to density measuring apparatus. Many features of the invention are of particular utility in such apparatus, but it will be readily apparent that certain features of the invention may be utilized to advantage in apparatus for measuring other variable conditions.

Many devices are known which are sensitive to small changes in density. Such devices are generally delicate and the variation in the measuring force produced by such a device in response to a small change in density is usually of the same order of magnitude as the density change. Any attempt to increase the amount of force available from such a sensitive device usually results in an increased load on the device and a consequent loss of sensitivity and increased sluggishness of response to a change in density. Consequently, such devices commonly employ complex electrical or electronic pick-off systems to avoid loading the sensitive parts.

An object of the invention is to provide improved apparatus for measuring a variable condition, including a condition responsive element and means for controlling a motor in accordance with the value of the condition without loading the element.

Another object of the present invention is to provide density measuring apparatus including a sensitive density responsive element and a load device such as an indicating, recording or controlling mechanism whose position is controlled by the sensitive element, and means for supplying power from an outside source to the load device so that the sensitive element is substantially unloaded and is not required to develop any power for operating the load device.

Another object is to provide improved means for measuring the density of a flowing fluid including a density sensitive element immersed in the fluid and controlling a motor located outside the path of fluid flow.

Another object is to provide improved density measuring means which will operate accurately under widely varying conditions of pressure, temperature and viscosity of the liquid, and of acceleration of the apparatus.

A further object is to provide density measuring means suitable for measuring the density of fuel in an aircraft.

Another object is to provide a sensitive density responsive mechanism which is capable of operating a simple control device such as an electric switch.

The foregoing and other objects of the invention are accomplished by providing a density sensing unit including a chamber filled with the fluid whose density is to be measured. In the chamber, a pivotally mounted arm carries a float which applies to the arm a buoyant force varying with the density of the fluid. A counterweight is movable along the arm and is driven by a motor located outside the chamber and connected to the counterweight through a mechanical train including a magnetic coupling acting through a wall of the chamber. The motor is controlled by a magnetically operated switch located just outside a wall of the chamber and operated by a magnet within the chamber which is rotated by the arm.

The magnetic switch controls the motor through a relay which causes the motor to run in one direction when the arm moves in one sense beyond a normal position and causes the motor to run in the opposite direction when the arm moves in the opposite sense beyond that normal position. The motor therefore continuously oscillates or hunts, driving the weight first inwardly and then outwardly along the arm so that the arm moves back and forth about the normal position. The period of oscillation is made short so that any change in density in either sense will produce a prompt response by changing the distance through which the motor must run in one direction or the other in order to balance the arm at the normal position. The motor drives an indicator or other load device through a suitable driving connection. This driving connection incorporates a lost motion arrangement having sufficient amplitude to permit the normal oscillating operation of the motor without affecting the position of the indicator or other load device.

The sensitivity of the system is increased and the amplitude of oscillation reduced by providing an anticipating effect acting through the mechanism for driving the counterweight. This anticipating effect is obtained by causing the motor to apply a small torque to the pivoted arm, the direction of this torque being determined by the direction of rotation of the motor, and being the same in either direction of rotation of the motor as the direction of the increment of torque produced by the movement of the counterweight by rotation of the motor in that direction.

Other objects and advantages of the invention will become apparent from consideration of the following specification, together with the accompanying drawings in which:

Fig. 1 is a plan view of the density sensing unit, with part of the casing broken away to reveal the internal structure.

Fig. 2 is a view partly in elevation and partly in section on the line II—II of Fig. 1, with certain parts broken away.

Fig. 3 is a sectional view taken generally on the line III—III of Fig. 1.

Fig. 4 is a sectional view on the line IV—IV of Fig. 2.

Fig. 5 is a somewhat diagrammatic illustration of a density measuring apparatus constructed in accordance with the invention, including a wiring diagram of the electrical parts.

The density sensitive unit includes a base casting 1 having a peripheral flange attached by means of bolts 2 to a similar flange on a cover casting or casing 3. The casing 3 is provided with an inlet 4 (Fig. 2) and an outlet 5 for the fluid whose density is to be measured. The casing 3 and the base 1 together define a chamber 6. Inside the chamber 6 is pivotally mounted a supporting arm generally indicated by the numeral 7 and including an inner yoke end plate 8 connected to an outer yoke end plate 9 by means of support rods 10. The arm 7 carries at its outer end a float or displacement member 11 and a fixed counterweight 12. The arm 7 carries a movable counterweight 13 which is apertured to receive the rods 10. The counterweight 13 has a threaded central aperture to receive a lead screw 14 which is journaled in the yoke end plates 8 and 9.

The displacement member 11 applies to the arm an upward force and hence a torque varying with the density of the fluid. The counterweight 13 applies to the arm a constant downward force which produces a torque varying with the position of the counterweight along the arm. As long as the opposing torques are balanced, the arm remains in a fixed position.

The inner yoke end plate 8 is provided with a pair of spaced flanges 8a which carry cratered bearings cooperating with pointed pivot pins 15 mounted on yoke supports 16.

The lead screw 14 extends through the inner yoke end plate 8 and on the side of that plate opposite the counterweight 13 the lead screw carries a gear 17 (see Fig. 3). It should be especially noted that the gear 17 is positioned slightly radially outward from the pivot axis of arm 7, for a purpose to be described below. The gear 17 meshes with an idler gear 18 mounted on a stub shaft carried by the base 1. The idler gear 18 meshes in turn with another idler gear 19 which meshes with a pinion 20. The pinion 20 is fixed on a shaft 21 which extends into a recess 1a (see Fig. 2) formed within a projection 25 in the base 1, where the shaft 21 carries a multiple pole permanent magnet 22, best shown in Fig. 4. The yoke supports 16 are attached to a supporting plate 23. The various stub shafts and the shaft 21 are journaled in the supporting plate 23, which is held in place in a suitable recess in the base 1 by means of a snap ring 24. The plate 23 also carries a pair of adjustable stops 23a, which limit the angular movement of the arm 7 by engaging portions of the inner yoke end plate 8.

The periphery of the multiple pole magnet 22 is closely spaced from the inside of the wall of projection 25. A ring magnet 26 encircles the wall of projection 25 and is aligned with the magnet 22. The ring magnet 26 is supported by a retainer 27 carried by a shaft 28 journaled in a bearing 29 mounted in a yoke 30 attached to base casting 1.

The inner yoke end plate 8 carries at one end a bracket 31 (see Fig. 1) which supports a switch actuating bar magnet 32. The magnet 32 is located adjacent the central portion of a non-magnetic switch housing 33 shown as a simple tube inserted through a suitable sealing bushing 34 in the casting 1 and sealed at its inner end. The housing 33 in effect forms a part of the wall of chamber 6. Inside the housing 33 is located a magnetic switch 35. The switch 35 includes two leaf spring contacts 36 and 37 of magnetic material, self-biased to open position, but moved to engage one another when the poles of the magnet 32 are moved into alignment with the two contacts so that the external flux between the magnet poles passes through the aligned ends of the contacts.

Since both the counterweight drive and the switch mechanism are operated through the casing wall by magnetic couplings, there is no danger of leakage at these points and the apparatus may therefore be operated at high internal pressures.

Referring to Fig. 5, it may be seen that the contacts 36 and 37 control an energizing circuit for the winding 38 of a relay generally indicated at 39. This circuit may be traced from one terminal of a suitable source of electrical energy such as a battery 40 through a wire 41, winding 38, wire 42, contacts 36 and 37 and ground connections 43 and 44 to the opposite terminal of battery 40.

The relay 39 includes movable contacts 45 and 46 which are biased to engage stationary back contacts 47 and 48, respectively. When the winding 38 is energized, the movable contacts 45 and 46 are operated to disengage from back contacts 47 and 48 and to engage front contacts 49 and 52, respectively.

The movable contacts 45 and 46 control a pair of energizing circuits for the armature winding 50a of a motor 50 which is connected through gears 51 and 52a to the shaft 28 which drives the counterweight 13 along the arm 7 through the gear train previously described.

The energizing circuits for the armature winding 50a also include limit switches 53 and 54 operated respectively by cams 55 and 56 on a cam shaft 57 driven by the motor 50 through gears 51, 52a and 58.

The armature energizing circuits also include a gravity operated reversing switch comprising movable contacts 59 and 60 biased to engage stationary back contacts 61 and 62. The movable contacts 59 and 60 are connected to a weight 63 so that if the apparatus is inverted the contacts 59 and 60 are moved out of engagement with the back contacts 61 and 62 and into engagement with front contacts 64 and 65, respectively.

The gear 51 driven by motor 50 carries a lug 66 which cooperates with another lug 67 carried by a gear 68. The gear 68 meshes with a gear 69 fixed on a shaft 70 which drives a pointer 71 over a scale 72. The lugs 66 and 67 form a lost motion connection for a purpose described below.

When the winding 38 of relay 39 is energized, as shown (contacts 36—37 closed) the armature winding 50a of motor 50 is energized through a circuit which may be traced from the upper terminal of battery 40 through wires 41 and 73, contacts 46 and 52, wire 81, limit switch 53, wire 77, contacts 61 and 59, wire 76, armature 50a, wire 75, contacts 60 and 62, wire 74, contacts 49 and 45, wire 79 and ground connections 80 and 44 to the opposite terminal of battery 40.

When the winding 38 of relay 39 is de-energized, the armature winding 50a of motor 50 is energized through a circuit which may be traced from the upper terminal of battery 40 through wires 41 and 73, contacts 46 and 48, wire 74, contacts 62 and 60, wire 75, armature winding 50a, wire 76, contacts 59 and 61, wire 77, limit switch 54, wire 78, contacts 47 and 45, wire 79 and ground connections 80 and 44 to the opposite terminal of battery 40.

It should be noted that in the second circuit just traced, the polarity of the battery is reversed with respect to the armature winding terminals as compared to the first circuit. The motor 50 has a permanent magnet field 50b of fixed polarity. Consequently, it will be understood that the motor 50 rotates in one direction when the contacts 36 and 37 are closed and relay winding 38 is energized and in the opposite direction when contacts 36 and 37 are open and winding 38 is deenergized.

*Operation*

First assume that the density of the fluid in chamber 6 remains constant. When the parts are in the positions shown in Fig. 5, contacts 36 and 37 are closed, and the motor 50 is running in a predetermined direction. Let it be assumed that this direction is the proper one to drive the counterweight 13 outwardly along the arm 7, or to the left as it appears in the drawings. As the counterweight moves to the left, the arm 7 is depressed downwardly about its pivot axis, rotating the magnet 32. At a certain angular position to the magnet 32, its field moves out of alignment with contacts 36 and 37 far enough to decrease the attraction between those contacts so that they disengage each other. This opens the circuit previously traced for energizing the relay winding 38, which drops its contacts and thereby causes the motor 50 to reverse, driving the counterweight 13 inwardly on the arm 7, or to the right as it appears in Fig. 5. As the counterweight 13 starts moving to the right, the arm 7 is raised, thereby rotating the magnet 32 in the opposite direction. As this motion continues, the magnet 32 moves far enough to bring its field into alignment with the contacts 36 and 37 whereupon the magnetic attraction between the contacts is greater than their opposing self-bias, and the contacts engage. It should be noted that there is a substantial differential or travel of the magnet between the point at which the contacts 36 and 37 first engage one another and the point where they separate. The reason for this is that the contacts may be held in engagement by a magnetic field weaker than the field required to move the contacts into engagement when they are separated.

It may therefore be seen that the system continuously oscillates, driving the counterweight 13 first outwardly along the arm 7 and then inwardly. The distance of this oscillation or hunting is determined by the differential in the magnetic switch 35, the lost motion in the various gear trains and the friction and inertia of the various parts. It is desirable to reduce this hunting to a very small proportion of the total travel of the counterweight 13. In order to reduce the magnitude of the hunting, there is provided an anticipating torque feedback to the arm 7. For this purpose, the gear 17 carried by the arm 7 is located radially outward from the axis about which the arm 7 pivots. Thus when the gear 18 drives the gear 17 to move the counterweight in and out, it also applies a small torque to the arm 7. The gear train is so designed that this torque is in the proper direction to anticipate the change in torque on the arm which will be produced by the movement of the counterweight 13. For example, if the gear 17 is being rotated in a direction to move the counterweight 13 outwardly, then the anticipating torque acts downwardly at the gear 17. On the other hand, if the gear 17 is rotating in a direction to move the counterweight 13 inwardly, then the torque acts upwardly at the gear 17. The distance between gear 17 and the pivot axis of arm 7 may be chosen so as to reduce the amplitude of the hunting to less than 1% of the full stroke of counterweight 13.

The cycle of oscillation of the counterweight 13 will be continuously repeated as long as the apparatus is in operation. The weight 13 hunts back and forth about an equilibrium position given by the following equation:

$$[m_1(g+a) - v_1 p(g+a)]x + [m_2(g+a) - v_2 p(g+a)]L = 0$$

In which:

$m_1$ = mass of the weight 13.
$v_1$ = volume of the weight 13.
$g$ = the component, perpendicular to the plane defined by the pivots 15 and the center of the displacement member 11, of the acceleration due to gravity.
$a$ = the component of the local acceleration, perpendicular to the same plane.
$p$ = mass density of the fluid in the casing 3.
$x$ = distance from the axis of the pivots 15 to the center of gravity of the weight 13 at the equilibrium position.
$m_2$ = mass of the displacement member 11.
$v_2$ = volume of the displacement member 11.
$L$ = distance from the axis of pivots 15 to the center of the displacement member 11.

It will be noted that the factor $(g+a)$ may be cancelled out of the above equation. This means that the position of the weight 13 is unaffected by local accelerations, provided only that $(g+a)$ is not zero. This makes the instrument suitable for use in military aircraft which may be subjected to values of $(g+a)$ of 10 g. or more.

In inverted flight of an aircraft, $g$ becomes negative. The value of $x$ in the above equation will remain in the same, but the switch 35 will open when it should close and vice versa. This effect is overcome by inserting the reversing switch contacts 59 and 60, operated by a weight 63, in the leads to the motor 50, so as to reverse the connections to the motor 50 when $g$ is negative. This "g" switch is shown somewhat diagrammatically in Fig. 5.

Since the only other variable in the above equation is $p$, the density or mass per unit volume of the liquid, the distance $x$ is determined solely by that factor. Since the gear 68 rotates in a fixed ratio to the rotations of the screw 14, gear 68 can be used to position any desired form of load device in accordance with the density $p$. While it is true that this distance $x$ is not exactly linear with $p$, it can be made to approach linearity by keeping $v_1$ relatively small. This may be shown by cancelling $g+a$ from the above equation and rewriting it in the form:

$$x = \frac{-(m_2 - v_2 p)L}{m_1 - v_1 p}$$

If $v_1$ is small, the denominator in the above equation becomes substantially equal to $m_1$ so that $x$ is then substantially linear with $p$.

A similar result might be secured by making the weight fixed and moving the float. However, the float position would then vary with $p$ in accordance with the equation $$L = -\frac{(m_1 - v_1 p)x}{m_2 - v_2 p}$$

From this equation, it is apparent that the float position cannot be linear with $p$ unless $v_2$ is made small. But $v_2$ is the float volume and the sensitivity of the system varies directly with the float volume, so that it is distinctly not convenient to make the float small. Consequently, it may be seen that there is a substantial practical advantage to having the float fixed and the weight movable as compared to the opposite construction.

Alternatively, both the float and the weight could be made movable and driven in opposite directions simultaneously by a differential screw arrangement. This would introduce an additional non-linearity into the relationship between the float or counterweight position and the density, but such a non-linearity might be desirable under some conditions.

While the counterweight is shown as supported by and moving along the arm 7, it could be supported on a separate structure providing that structure is operatively connected to the arm 7 for concurrent movement therewith.

Although the counterweight is shown as being driven by a motor, it may in some cases be operated manually.

In some installations, other means besides a counterweight might be used for applying to the arm a torque opposing that of the float. For example, such a means might include a spring retained in compression between the arm 7 and a fixed or movable support.

Let it now be assumed that there is a change in density of the fluid inside the casing 3. If the density decreases, for example, then the buoyant force acting upwardly on the float 11 is decreased, so that the arm 7 tends to move downwardly about its pivot. Although this decrement of the buoyant force may be so small that it does not actually produce any downward movement of the arm, it will be effective on the next inward movement of the counterweight 13 to require an additional movement of the counterweight to bring the arm back to its normal range of oscillation. Similarly, an increase in the density of the fluid will require an additional outward movement of the counterweight 13 to bring the arm back to its normal range of oscillation. It may therefore be seen that the position of the counterweight 13 along the arm 7 is an indication of the density of the fluid in the casing 3. This quantity is also indicated by the position of pointer 71 relative to the scale 72. The lost motion connection between gear 51 and gear 68, which connection includes the lugs 66 and 67, is designed to allow a movement of the motor sufficiently to move the counterweight through its normal range of oscillation without moving the pointer 71. However, if the density of the fluid changes, then the motor must drive the counterweight in one direction or the other through a greater distance than its normal oscillating range in order to balance the arm 7, and during that travel of the motor, the lost motion between the lugs 66 and 67 is taken up and the pointer 71 is driven to indicate on the scale 72 the changed value of density.

It should be emphasized that in the system as described above, the float 11 is not required to provide any substantial force to the arm 7 for operating the switch 35, for overcoming friction, or for any other purpose. All the power needed for operation of the system is supplied by the motor 50. The system is very sensitive to changes in density, since even a slight change will affect the distance through which the counterweight 13 must be moved to operate the switch 35 in the normal manner.

While the invention has been illustrated as applied to a system for operating a pointer over a scale, it should be apparent that the same system may be applied to the operation of other types of load devices. For example, the system can be used to operate recording apparatus or controlling apparatus. For another example, it may be used to measure the density of fluid flowing through a pipe line, and to operate a valve so as to shift the discharge of the pipe line from one tank to another when a density change indicates that a different fluid is being pumped. Alternatively, the density measuring apparatus disclosed herein may be used to operate a variable ratio drive mechanism between a volumetric flow meter and a gravimetric flow indicating or recording apparatus, as described and claimed in our copending application Serial No. 274,986, filed March 5, 1952, entitled Density Compensated Flow Meter, and assigned to the assignees of the present application.

Apparatus constructed in accordance with the invention may also be used to control the ratio of the volumes of two flowing liquids so as to produce a pre-selected density of their mixture.

We claim:

1. Apparatus for measuring the density of a liquid, comprising a support mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of the torques applied to said support, a reversible motor, means including said motor for driving said torque varying means, a control device movable between first and second positions, means for operating said device in response to the angular movement of said support and effective to move the device to its first position upon movement of the support to a first predetermined angular position in a prime direction and to hold the device in its first position until the support moves back through said first angular position in the other direction toward a second predetermined angular position, means including said device for controlling said motor and effective when the device is in said first position to operate the motor in a direction to vary said given torque in a sense so that the support moves in said other direction to said second predetermined angular position and the device is operated to its second position, said motor controlling means also being effective when the device is in its second position to operate the motor to vary said given torque in the opposite sense so that the support moves in said prime direction until the device is operated to its first position, a load device to be positioned in accordance with the density of the liquid, and a driving connection between said motor and said load device for operating said load device to said position.

2. Apparatus for measuring the density of a liquid, comprising a support mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of the torques applied to said support, a reversible motor, means including said motor for driving said torque varying means, a control device movable between first and second positions, means for operating said device in response to the angular movement of said support and effective to move the device to its first position upon movement of the support to a first predetermined angular position in a prime direction and to hold the device in its first position until the support moves back through said first angular position in the other direction toward a second predetermined angular position, means including said device for controlling said motor and effective when the device is in said first position to operate the motor in a direction to vary said given torque in a sense so that the support moves in said other direction to said second predetermined angular position and the device is operated to its second position, said motor controlling means also being effective when the device is in its second position to operate the motor to vary said given torque in the opposite sense so that the support moves in said prime direction until the device is operated to its first position, a load device to be positioned in accordance with the density of the liquid, and a driving connection between said motor and said load device for operating said load device to said position, said connection including lost motion means permitting said motor to move through a predetermined distance without moving the load device.

3. Apparatus for measuring the density of a liquid, comprising a container at least partly filled with said liquid, an arm in said container mounted for angular movement about a horizontal axis, a displacement member on said arm and spaced from said axis and completely immersed in said liquid, said displacement member being effective to apply to said arm a torque varying with the density of said liquid, means for applying to said arm a torque opposing the torque of said displacement member, means inside said container and movable through a limited range of travel and operatively connected to said arm to vary at least one of said torques, a magnetic clutch including a rotatable driven element inside said chamber and connected to said torque varying means for movement therewith, said magnetic clutch including a rotatable driving element adjacent said driven element and outside said chamber, a reversible electric motor, means including said motor and said magnetic clutch for driving said torque varying means, means for controlling said motor in response to the angular movement of said arm, density indicating means driven by the motor concurrently with rotation of the rotatable driving element of said clutch, circuits for energizing the motor including a pair of limit switches, and means driven by the motor for operating the respective limit switches substantially at the respective limits of the movement of the torque varying means to deenergize said motor.

4. Apparatus for measuring a variable condition, comprising a support mounted for angular movement about an axis, means for applying to said support a torque varying in accordance with said condition, means for applying to said support a counteracting torque, means for varying at least a given one of said torques, a reversible motor, means including said motor for driving said torque varying means, a control device movable between first and second positions, means for operating said control device in response to the angular movement of said support and effective to move the device to its first position upon movement of the support to a first predetermined angular position in a prime direction and to hold the device in its first position until the support moves back through said first angular position in the other direction toward a second predetermined angular position, and means including said device for controlling said motor and effective when the device is in said first position to operate the motor to vary said given torque in a sense so that the support moves in said other direction to said second angular position and the device is operated to its second position, said motor controlling means also being effective when the device is in its second position to operate the motor to vary said given torque in the opposite sense so that the support moves in said prime direction until the device is operated to its first position, a load device to be positioned in accordance with said variable condition, and a driving connection between said motor and said load device for operating said load device to a position determined by the movements of said support.

5. Apparatus for measuring the density of a liquid, comprising a wall inclosing a chamber containing said liquid, a support in said chamber mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of the torques applied to said support, a magnetic clutch including a rotatable driven element inside said chamber and connected to said torque varying means for movement therewith, said magnetic clutch including a rotatable driving element adjacent said driven element and outside said chamber, means including a reversible motor and said magnetic clutch for driving said torque varying means, a switch operable between two circuit controlling positions by variation of a magnetic field in which the switch is located, said switch being located adjacent and outside of the wall of said chamber, a magnet connected to said support and movable adjacent said switch inside of said wall to operate the switch in accordance with the angular position of the support, means including said switch for controlling the motor to drive said torque varying means to determine a relation of the torques, and a load device to be positioned in accordance with the density of said fluid and driven by said motor concurrently with the driving of said torque varying means.

6. Apparatus for positioning a movable element in accordance with the density of a liquid, comprising said movable element, a support mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of said two opposed torques independently of the angular position of the support, and means operatively connecting said element to said support for effecting movement of said element to different positions in accordance with the angular position of said support.

7. Apparatus for positioning a movable element in accordance with the density of a liquid, as defined in claim 6, in which said means for applying said opposing torque comprises a counterweight member supported for angular movement about an axis spaced therefrom, and means operatively connecting the counterweight member to said displacement member support for concurrent angular movement of said counterweight member with said angular movement of said displacement member and support, said torque varying means comprising means for varying the moment arm of one of said members.

8. Apparatus for positioning a movable element in accordance with the density of a liquid, comprising said movable element, a container at least partly filled with said liquid, a support in said container mounted for angular movement about a horizontal axis, a displacement member on said support and spaced from said axis and completely immersed in said liquid, said displacement member being effective to apply to said support a torque varying with the density of said liquid, means within said container and operatively connected to said support for applying to said support a torque opposing the torque of said displacement member, means operable from outside the container and operatively connected to said means within said container and to said support for varying at least a given one of said opposing torques independently of the angular position of the support, said movable element being located outside the container, and means operatively connecting said element to said support for effecting movement of said element to position in accordance with the angular position of said support.

9. Apparatus for positioning a movable element in accordance with the density of a liquid, as defined in claim 6, in which said means for applying said opposing torque is a counterweight mounted on said support and spaced from the axis thereof, and said torque varying means includes means for moving said counterweight radially with respect to said axis.

10. Apparatus for measuring the density of a liquid, comprising a support mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of the torques applied to said support, means including a reversible motor for driving said torque varying means, means driven by said motor for transmitting to said support an anticipating torque acting in the same sense as the increment of torque produced by the movement of said torque varying means through operation of the motor, means responsive to the angular position of said support for controlling the motor to drive said torque varying means in a direction to determine the opposing relation of said two opposed torques, and a load device to be positioned in accordance with the density of said liquid and driven by said motor concurrently with said torque varying means.

11. Apparatus for measuring the density of a liquid, comprising a support mounted for angular movement about a horizontal axis, a displacement member on said support and spaced from said axis and completely immersed in said liquid, said displacement member being effective to apply to said support a torque varying with the density of said liquid, a counterweight member on said support for applying a torque opposing the torque of said displacement member, means for moving at least one of said members radially with respect to said axis along said support, said means including a reversible motor and a first gear rotatable on a fixed support and driven by said motor and a second gear journalled in said angularly movable support and operatively connected to said movable member and spaced from said horizontal axis and rotatable about an axis perpendicular to said horizontal axis, said second gear meshing with said first gear and effective during rotation thereof to transmit to said support an anticipating torque acting in the same sense as the increment of torque produced by the movement of said movable member through rotation of said second gear, means responsive to the angular position of said support for controlling the motor to drive said movable member in the direction toward a position in which said opposed torques are in balance, and a load device to be positioned in accordance with the density of said liquid and driven to different positions by said motor concurrently with the driving of said movable member.

12. Apparatus for measuring the density of a liquid, comprising a support mounted for angular movement about a horizontal axis, a displacement member on said support and spaced from said axis and completely immersed in said liquid, said displacement member being effective to apply to said support a torque varying with the density of said liquid, means for applying to said support a torque opposing the torque of said displacement member, means for varying at least a given one of the torques applied to said support, means including a reversible motor for driving said torque varying means, means responsive to the angular position of said support for controlling the motor to drive said torque varying means forwardly and reversely toward positions of balance of said opposed torques, a load device to be positioned in accordance with the density of said liquid and driven to different positions by said motor concurrently with said torque varying means, a chamber filled with said liquid and enclosing said support and said displacement member and said torque varying means, a reversing switch connected to said motor and to said motor controlling means, and gravity responsive means connected to said reversing switch for operating the reversing switch to reverse the direction of driving said torque varying means when said chamber is inverted.

13. Apparatus for measuring a variable condition, comprising a support mounted for angular movement about an axis, means for applying to said support a torque varying in accordance with said condition, means for applying to said support a counteracting torque, means for varying at least a given one of said torques, a reversible motor, means including said motor for driving said torque varying means, means driven by said motor for transmitting to said support an anticipating torque acting in the same sense as the increment of torque produced by movement of said torque varying means, means responsive to the angular position of the support for controlling the motor to drive the torque varying means in a direction to determine the opposing relation of said opposed torques, a load device to be positioned in accordance with said variable condition, and a driving connection between said motor and said load device for operating said load device to a position corresponding to the position of said torque varying means.

14. Apparatus for measuring a variable condition comprising a condition responsive member mounted for movement thereof to different positions, means for applying to said member a force varying in accordance with variations in said condition to produce movement of said member to said different positions, a member operatively connected to said condition responsive member and movable forwardly and reversely along a predetermined path for applying to said condition responsive member a force varying with the position of said movable member along said path and opposing said first force, a reversible motor, means including said motor for driving said movable member forwardly and reversely along said path, a load device driven by said motor to different positions concurrently with movement of said movable member to different positions along said path, means including a source of supply connected in circuit with said motor for energizing said motor and including a pair of limit switches respectively operably to deenergize said motor respectively in the forward and reverse movements of said motor and of said movable member driven thereby, and means driven by said motor and operatively connected to said limit switches for operating the respective limit switches in the positions of said movable member substantially at the respective limits of its movements.

15. Apparatus for measuring the density of a liquid, comprising a support mounted for movement thereof forwardly and reversely, a displacement member carried on said support and completely immersed in said liquid, said displacement member being effective to apply to said support a force varying with the density of said liquid, means for applying to said support a force opposing said force of said displacement member, means for varying at least one of the forces applied to said support, a reversible motor, means including said motor for driving said force varying means, a control device movable between first and second positions, means for operating said device in response to the movement of said support and effective to move the device to its first position when the support moves beyond a first predetermined position in a prime direction and to hold the device in its first position until the support moves back through said first predetermined position in the other direction, means including said device for controlling said motor and effective when the device is in said first position to operate the motor in a direction to vary said given force in a sense so that the support moves in said other direction beyond a second predetermined position and the device is operated to a second position, said motor controlling means also being effective when the device is in its second position to operate the motor to vary said given force in the opposite sense so that the support moves in said prime direction back through said second predetermined position and the device is operated to its first position, so that said support is reciprocatably moved about a position intermediate said predetermined positions, a load device to be positioned in accordance with the density of the liquid, and a driving connection between said motor and said load device for moving said load device to a position determined by the movements of said force varying means.

16. Apparatus for measuring the density of a fluid comprising a container for said fluid, a displacement member disposed within said container so as to be immersed in said fluid and supported for movement thereof in given and reverse directions in relation to said container respectively upon increase and decrease concomitantly with variation in the density of said fluid of the force acting on said displacement member produced by said immersion thereof, means supported for movement thereof in a forward and the reverse directions and operatively connected to said displacement member for applying to said displacement member a force opposing said force produced by said immersion of said displacement member, said opposing force being greater and less in different positions of said means in said movement thereof, a control device operatively connected to said means for controlling the movement of said means in said forward and reverse directions of movement thereof in succession in response to variation of the resultant of said forces produced by said movements of said means in its respective directions and so as reversely to vary said opposing force, and a load device having an element supported for movement thereof forwardly and reversely and operatively connected to said control device and actuated in response to changes in the direction of said resultant of said forces to produce forward and reverse movements of said element to determine positions of said load device element corresponding to the density of said fluid.

17. Apparatus for measuring the density of liquid comprising a container for said liquid, a displacement member supported within said container for pivotal movement thereof upon a horizontal axis and in generally horizontally spaced relation to said axis for upward and downward movement of said displacement member upon said pivotal movement thereof, said displacement member being completely immersed in said liquid in said container so as to be subjected to a force produced by said immersion thereof acting upwardly on said displacement member and to move upwardly and downwardly respectively upon increase and decrease in the density of said liquid, a weight supported within said container for pivotal movement thereof upon an axis and for movement thereof generally horizontally outwardly from and inwardly toward its pivotal axis, means operatively connecting said weight to said displacement member for applying to said displacement member a force developed by said weight and opposing said force produced by said immersion of said displacement member, said applied force being greater and less in accordance with the position of said weight respectively outwardly from and inwardly toward its pivotal axis, a control device operatively connected to said displacement member and to said weight for moving said weight outwardly from an inwardly toward its axis upon changes in the position of said displacement member in said upward and downward movement thereof in response to variations in the resultant of said forces, and a load device having an element supported for movement thereof forwardly and reversely and operatively connected to said control device and actuated in response to change in the direction of the resultant of said forces to produce forward and reverse movements of said load device element to determine positions of said load device element corresponding to the density of said liquid.

References Cited in the file of this patent

UNITED STATES PATENTS 2,530,981  Mikina ---------------- Nov. 21, 1950